P. S. P. Conner.
Adhesive Composition.

No. 94,399.      Patented Aug. 31, 1869.

Witnesses:
Wm. A. Steel
Jno. B. Harding

Inventor:
P. S. P. Conner
by his Atty
H. Howson

United States Patent Office.

PHILIP S. P. CONNER, OF PHILADELPHIA, PENNSYLVANIA.

Letters Patent No. 94,399, dated August 31, 1869.

IMPROVED PRESSURE-ADHESIVE GUM FOR ENVELOPES, &c.

The Schedule referred to in these Letters Patent and making part of the same.

*To all whom it may concern:*

Be it known that I, PHILIP S. P. CONNER, of Philadelphia, Pennsylvania, have invented a new Adhesive Composition for Envelopes, Postage-Stamps, &c.; and I do hereby declare the following to be a full, clear, and exact description of the same.

My invention consists of an adhesive composition, described hereafter, to be applied to envelopes, wrappers, stamps, &c., the composition being such that no preliminary wetting is necessary to cause adhesion.

I first dissolve about an ounce of gum-elastic in about four ounces of spirits of turpentine. Then, in a separate vessel, I dissolve about one ounce of white shellac in an ounce and a half of alcohol.

I then mix the two solutions together, in about the proportion of two-thirds of the first to one-third of the second, and this mixture constitutes my improved adhesive composition.

Gum-arabic may be substituted for the shellac, but the latter is preferable.

If the composition is too thick, spirits of turpentine may be added until it is reduced to the desired fluidity.

The figure, in the accompanying drawing, illustrates the mode of applying my adhesive composition to an envelope.

The composition is applied to the inside of a flap at *a*, and to the back of the envelope at *b*, in such a manner, that when the flap is folded down, the two strips of the composition will coincide, or nearly so, for while the composition will, when in a fluid state, adhere to the paper, it has little or no affinity for the same when dry, adhesion taking place only when the composition on the flap comes in contact with that on the back of the envelope. All that is necessary, therefore, after the introduction of a letter is, to turn down the flap and press it with the hand, or rub it with the thumb-nail against the body of the envelope.

In packing these envelopes for use, however, care should be taken to turn the flap within the body, so as to prevent the accidental contact of the parts to which the composition has been applied.

Figure 1:
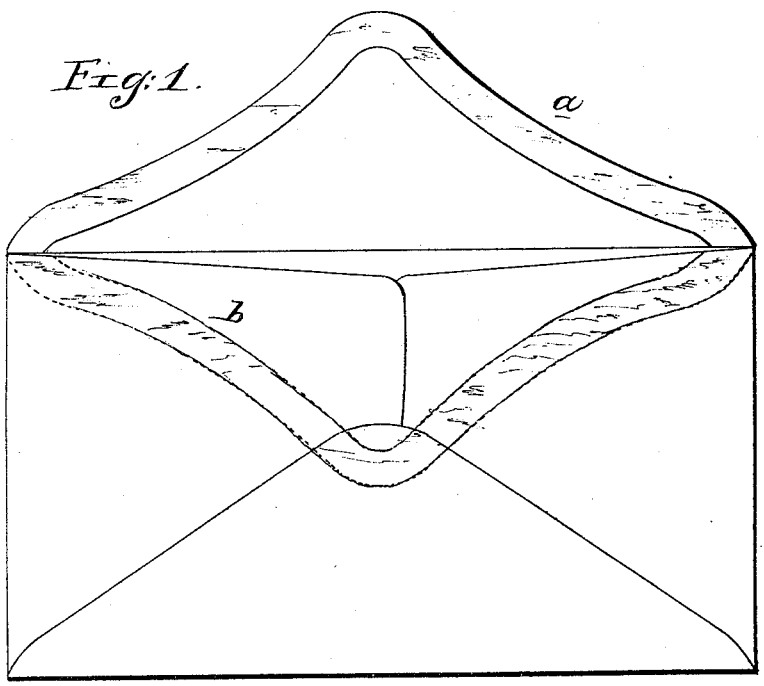
Figure 2:
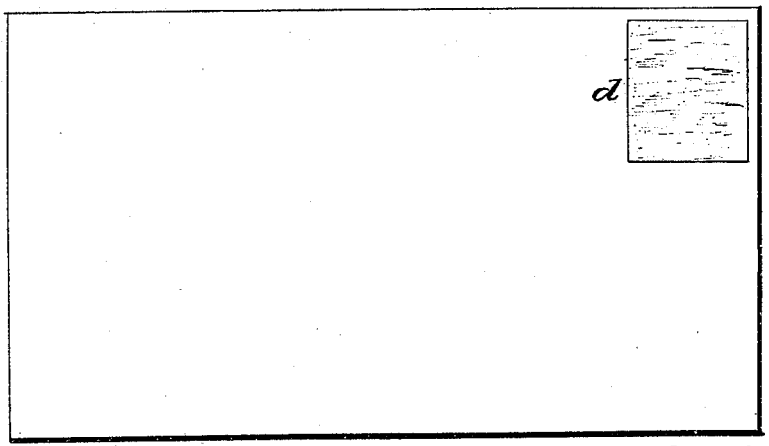

To the opposite side of the envelope, Figure 2, the composition may be applied at *d*, to an extent sufficient to receive a postage-stamp, and a sheet of stamps may be coated at the back with the composition, so that one of the stamps can be removed and applied to the envelope by simply placing it on the prepared portion *d* and pressing it down.

Although I have illustrated and described one example of the use of my adhesive composition, it will be evident that it may be used to advantage in many cases where gummed surfaces demanding preliminary wetting have been heretofore used.

Without confining myself to any specific proportion of ingredients, which may be modified without departing from my invention,

I claim, and desire to secure by Letters Patent—

An adhesive composition, consisting of the ingredients described, for the purpose specified.

In testimony whereof, I have signed my name to this specification, in the presence of two subscribing witnesses.

PHILIP S. P. CONNER.

Witnesses:
 JOHN WHITE,
 HARRY SMITH.